United States Patent
Brey

(12) 
(10) Patent No.: US 8,267,635 B2
(45) Date of Patent: Sep. 18, 2012

(54) FLOATING SEAL STUFFING BOX FOR SILO WITH RECIPROCATING FRAME

(75) Inventor: Charles G. Brey, Stillwater, MN (US)

(73) Assignee: Schwing Bioset, Inc., Somerset, WI (US)

(*) Notice: Subject to any disclaimer, the term of this patent is extended or adjusted under 35 U.S.C. 154(b) by 658 days.

(21) Appl. No.: 12/381,869

(22) Filed: Mar. 17, 2009

(65) Prior Publication Data
US 2010/0239398 A1 Sep. 23, 2010

(51) Int. Cl.
*B65G 65/30* (2006.01)
(52) U.S. Cl. ......... 414/306; 222/226; 222/234; 52/192
(58) Field of Classification Search .............. 414/306, 414/808; 277/431, 504, 505, 510; 222/226, 222/234; 210/319; 52/192
See application file for complete search history.

(56) References Cited

U.S. PATENT DOCUMENTS

| | | | |
|---|---|---|---|
| 3,297,366 A * | 1/1967 | Kauffman | 406/124 |
| 3,886,804 A * | 6/1975 | Winfield, Jr. | 74/18.2 |
| 3,985,244 A | 10/1976 | Gessler et al. | |
| 4,043,488 A | 8/1977 | Halvorsen et al. | |
| 4,157,761 A | 6/1979 | Debor | |
| 4,531,876 A | 7/1985 | Gessler | |
| 4,619,381 A | 10/1986 | Wurtz | |
| 4,729,198 A | 3/1988 | Nethery | |
| 4,731,179 A | 3/1988 | De Baere | |
| 4,763,777 A | 8/1988 | Hooper et al. | |
| 4,936,197 A * | 6/1990 | Brent | 92/168 |
| 5,407,103 A | 4/1995 | Clarstrom et al. | |
| 5,540,533 A | 7/1996 | Eskelinen | |
| 5,636,849 A * | 6/1997 | Jonsson et al. | 277/505 |
| 6,129,215 A | 10/2000 | Brauch et al. | |
| 6,190,105 B1 | 2/2001 | Zey | |
| 6,451,163 B2 | 9/2002 | Prough et al. | |
| 6,595,524 B1 * | 7/2003 | Zitting | 277/436 |
| 2006/0263180 A1 | 11/2006 | Brey et al. | |
| 2007/0110571 A1 * | 5/2007 | Bracken et al. | 415/198.1 |

FOREIGN PATENT DOCUMENTS

| | | |
|---|---|---|
| DE | 19912689 A1 | 9/2000 |
| EP | 0555953 A1 | 8/1993 |
| EP | 1086913 A1 | 3/2001 |
| EP | 0988244 B1 | 4/2003 |

* cited by examiner

*Primary Examiner* — Scott Lowe
(74) *Attorney, Agent, or Firm* — Kinney & Lange, P.A.

(57) ABSTRACT

A silo includes a stuffing box forming for use with a reciprocating frame. A push-rod extends from a hydraulic cylinder through a stuffing box and a silo wall to actuate a reciprocating frame. The stuffing box forms a floating seal around the push-rod capable of moving with the push-rod to accommodate misalignment.

17 Claims, 5 Drawing Sheets

FLOATING SEAL STUFFING BOX FOR SILO WITH RECIPROCATING FRAME

BACKGROUND

The present invention relates generally to a method and a device for discharging material from a silo. More specifically, the present invention relates to a stuffing box for a silo having a reciprocating frame.

Silos are large receptacles used to store and discharge materials. Silos usually have an inlet at the top and an outlet at the bottom. Virtually any type of material may be placed into a silo and later discharged. Viscous wet materials, however, are difficult to discharge because they are not free-flowing. For example, municipal waste sludge stored in silos tends to clump together and form bridges over a discharge opening. Discharge devices may be incorporated into the bottom of a silo above a discharge opening to dislodge material bridges and induce sludge flow.

Several types of discharge devices for coaxing sludge out of silos are known. In rectangular and square silos, the push floor design is common. The push floor consists of a series of hydraulically driven ladders that move linearly to convey sludge toward a discharge opening. In circular or polygonal silos, rotating scrapers or movable frames may be incorporated near the silo floor. In the case of rotating scrapers, radial arms extending from a central body include rotating or oscillating scrapers that break up clumps of sludge. In the case of movable frames, an open frame structure reciprocates back and forth over the silo floor pushing and pulling sludge along with it and over a discharge opening. While inclusion of a discharge device near the floor of a silo is known, the construction and operation of such discharge devices are far from ideal.

SUMMARY

An exemplary embodiment of the present invention is a silo having a stuffing box forming a floating seal around a push-rod. The silo has a wall which defines an interior and an exterior. A floor is attached to the wall. There is an opening in the floor and at least one reciprocating frame positioned immediately above and parallel to the floor. A stuffing box is adjacent an opening in the wall and a hydraulic cylinder is located adjacent the stuffing box. A push-rod extends from the hydraulic cylinder, through the stuffing box, and connects to the reciprocating frame for actuating movement of the reciprocating frame across the floor, wherein the stuffing box forms a floating seal around the push-rod capable moving angularly and laterally with the push-rod to accommodate misalignment.

Another exemplary embodiment of the present invention is a stuffing box forming a floating seal for use with a silo having a reciprocating frame. The stuffing box includes an angular floating seal housing and a lateral floating seal housing. The angular floating seal housing surrounds a pushrod as it exits a silo wall and is configured to accommodate angular movement of the push-rod. The lateral floating seal housing has a first side connected to the angular floating seal housing and second side connected to the silo wall. The lateral floating seal housing is configured to accommodate lateral movement of the push-rod.

DETAILED DESCRIPTION

One embodiment of the present invention is a floating seal stuffing box for use with a silo having at least one reciprocating frame. Usually a push-rod, attached to a hydraulic cylinder, actuates the frame across the silo floor. As the push-rod exits the silo, it can enter a stuffing box. The stuffing box removes residuary material from the push-rod and seals the silo contents off from the exterior environment. The push-rod, however, is often installed imperfectly. Even slight misalignment of the push-rod can cause the stuffing box to wear and require regular replacement of expensive parts. In one embodiment of the present invention, both angular and lateral misalignment of a push-rod is accommodated by a stuffing box that forms a floating seal. By allowing the stuffing box to move and flex or "float" with the push-rod, wear is reduced and efficiency is increased. The details of the present invention are described below.

Figure 1:
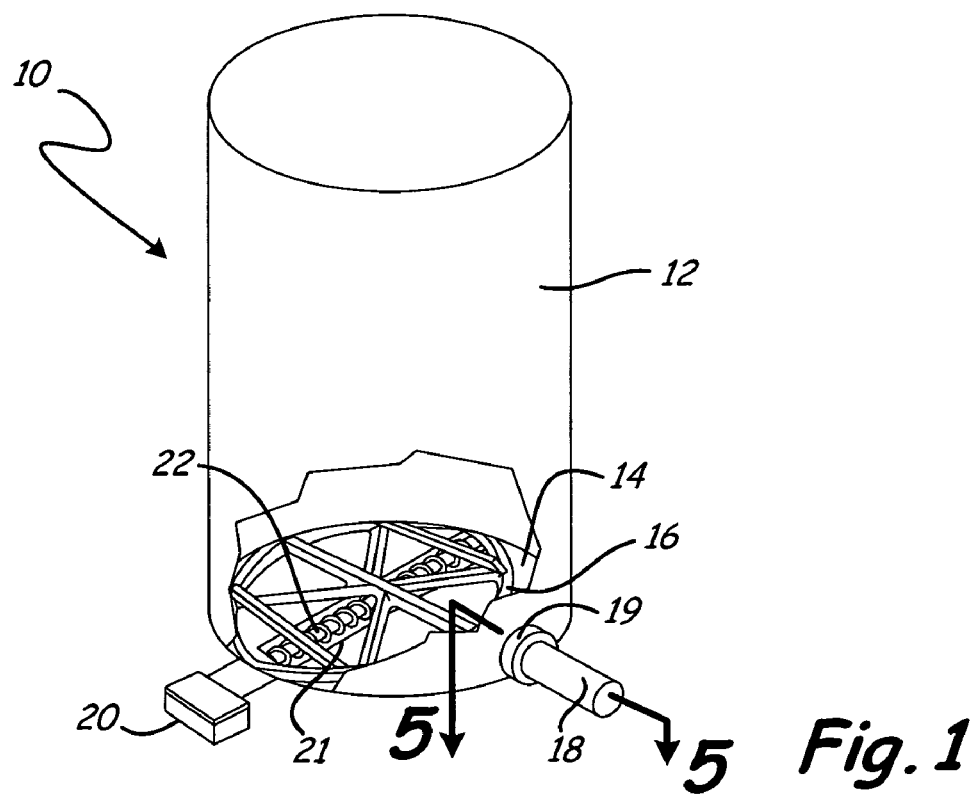
FIG. 1 is a perspective view of a silo containing a reciprocating frame.

FIG. 1 is a perspective view of silo 10 with a portion of perimeter wall 12 broken away to expose floor 14 and reciprocating frame 16. Also visible are hydraulic system 18, stuffing box 19, outlet 20, opening 21, and conveyor 22.

Silo 10 includes perimeter wall 12 attached to floor 14. Perimeter wall 12 is an upstanding cylinder resting on top of circular floor 14. Reciprocating frame 16 is located within silo 10 immediately above and parallel to floor 14. Reciprocating frame 16 is an open structure attached to hydraulic system 18, which extends beyond perimeter wall 12 and through stuffing box 19. Outlet 20 is also located exterior to perimeter wall 12. Opening 21 is an elongated rectangle extending across a diameter of floor 14. Below opening 21 is conveyor 22, which is connected to outlet 20.

Material is generally stored within silo 10 to be discharged at a later time. Usually, material is placed into silo 10 through an opening in a top of silo 10, although other configurations are known. Gravity causes material placed in silo 10 to accumulate near floor 14. All sorts of materials may be stored in silo 10, including dry materials, wet materials, or sludge-like combinations of wet and dry materials. When the material is highly viscous, it tends to resist natural gravitational flow. In at least this instance, it is desirable to include reciprocating frame 16 near floor 14 to mechanically induce flow in the viscous material. Reciprocating frame 16 is attached to hydraulic system 18, which actuates reciprocating frame 16 across floor 14. The resulting back and forth movement of reciprocating frame 16 breaks up cohesive masses while pushing and pulling the material toward opening 21 in floor 14. Beneath opening 21 is at least one conveyor 22. Material falls through opening 21 and onto conveyor 22, which may include a rotating screw and/or a means for metering the material. Conveyor 22 then discharges material from silo 10 via outlet 20. Discharged material may be picked up and transported to another location.

Figure 2:
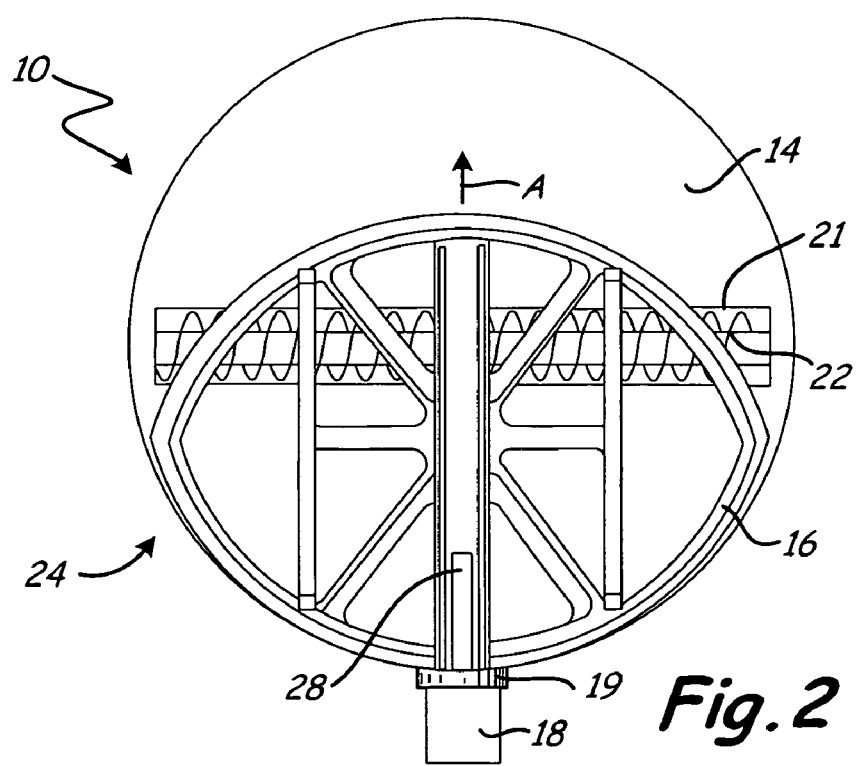
FIG. 2 is a top view of the inside of the silo with the reciprocating frame in a first position.
Figure 3:
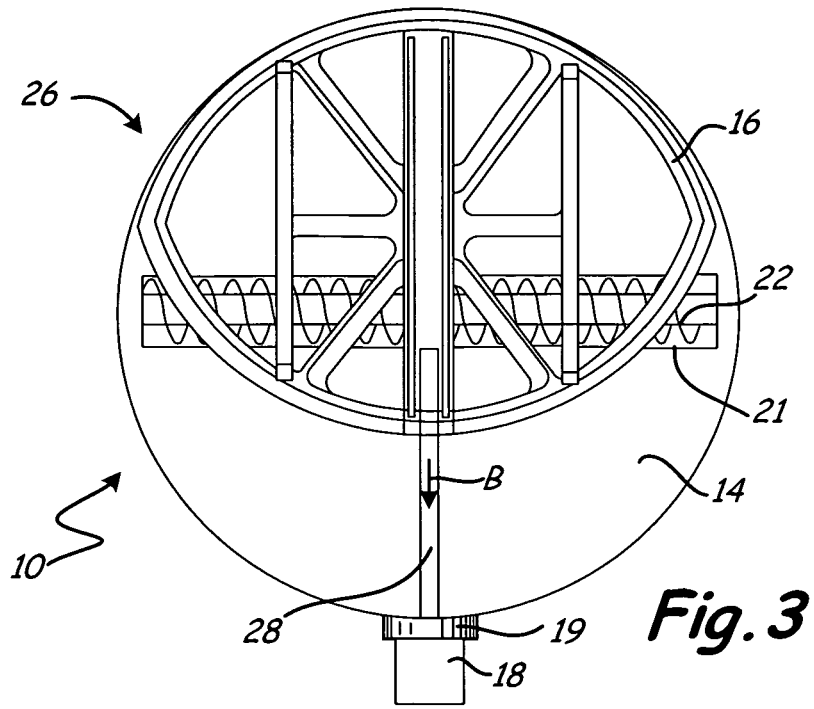
FIG. 3 is a top view of the inside of the silo with the reciprocating frame in a second position.

FIGS. 2 and 3 depict the movement of reciprocating frame 16 across floor 14. FIG. 2 is a top view of the inside of silo 10 with reciprocating frame 16 in first position 24. FIG. 3 is a top view of the inside of silo 10 with reciprocating frame 16 in second position 26. Also visible in FIGS. 2 and 3 are hydraulic system 18, stuffing box 19, opening 21, conveyor 22, and pushrod 28.

Reciprocating frame 16 is connected to hydraulic system 18 via pushrod 28. At rest, reciprocating frame 16 is in first position 24 as depicted in FIG. 2. Once activated, hydraulic system 18 drives pushrod 28 further into silo 10, which actuates reciprocating frame 16 across floor 14 in direction A. Reciprocating frame 16 leaves first position 24 pushing and pulling material toward opening 21 in floor 14. The movement of reciprocating frame 16 agitates viscous material and encourages material to fall through opening 21 onto conveyor 22. Reciprocating frame 16 will continue across floor 14 in direction A until pushrod 28 reaches full extension, or until an obstruction prevents further movement.

If no obstruction is encountered and hydraulic system 18 remains activated, reciprocating frame 16 will reach second position 26 on an opposite end of silo 10, which is depicted in FIG. 3. Reciprocating frame 16 will move across floor 14 once between occupying first position 24 and occupying second position 26. In second position 26, reciprocating frame 16 is remote from hydraulic system 18 and pushrod 28 is fully extended. Pushrod 28 is capable of retracting back toward hydraulic system 18 and actuating reciprocating frame 16 back across floor 14 in direction B. Reciprocating frame 16 leaves second position 26 pushing and pulling material toward opening 21, once again encouraging material to fall through opening 21 onto conveyor 22. If no obstruction is encountered and hydraulic system 18 remains activated, push-rod 28 will retract until reciprocating frame 16 has returned to first position 24. When returning to first position 24, push-rod 28 extends through an opening in the wall of silo 10 and into stuffing box 19 toward hydraulic system 18. The resulting movement of reciprocating frame 16 agitates viscous material and coaxes material to fall through opening 21 onto conveyor 22 for discharge from silo 10.

Figure 4:
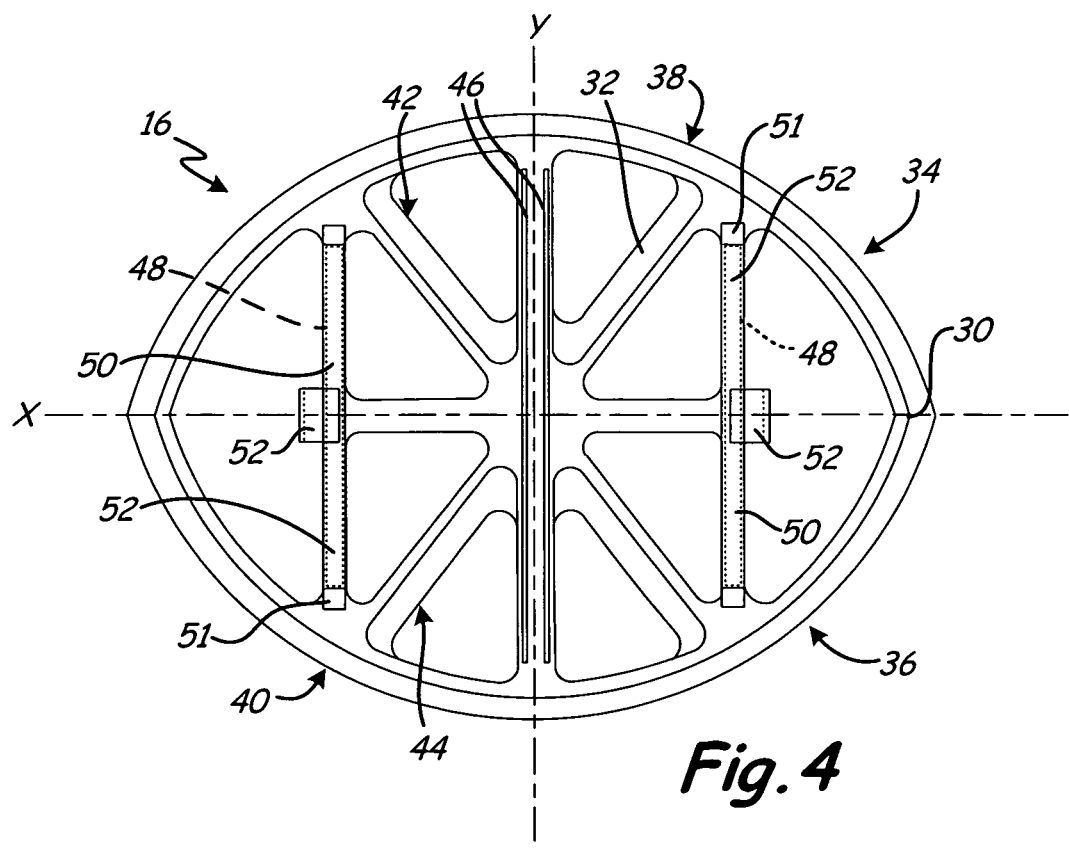
FIG. 4 is a detailed view of the reciprocating frame.

FIG. 4 is a detailed top view of reciprocating frame 16 including perimeter 30 and center scraper 32. For descriptive purposes, reciprocating frame 16 is divided into first half 34 and second half 36. First half 34 of perimeter 30 has first bevel 38 and second half 36 of perimeter 30 has second bevel 40. First half 34 of center scraper 32 has third bevel 42 and second half 36 of center scraper 32 has fourth bevel 44. Also visible are bars 46, support members 48, tubes 50, beveled ends 51, and hold-down plates 52.

Reciprocating frame 16 has perimeter 30, which contains center scraper 32. In one embodiment, perimeter 30 is shaped like an ellipse and center scraper 32 is shaped like the letter "X", which runs across the y-axis of perimeter 32. The shape of perimeter 30 and center scraper 32 is dependant on a multitude of factors such as the diameter of and the type of materials to be stored in a silo. Perimeter 30 and center scraper 32 are capable of assuming alternate shapes while achieving the objectives outlined below.

Center scraper 32 is centrally located within perimeter 30 so that first half 34 of center scraper 32 is attached to an inside surface of first half 34 of perimeter 30, and a second half 36 of center scraper 32 is attached to an inside surface of second half 36 of perimeter 30. First half 34 of perimeter 30 has first bevel 38 extending along an outer surface. Second half 36 of perimeter 30 has second bevel 40 extending along an outer surface. First half 34 of center scraper 32 has third bevel 42 extending along a surface opposite first half 34 of perimeter 30. Second half 36 of center scraper 32 has fourth bevel 44 extending along a surface opposite second half 36 of perimeter 30. In one embodiment, first bevel 38, second bevel 40, third bevel 42, and fourth bevel 44 all have angles between approximately 1 and 45 degrees, although any acute angle is within the scope of the present invention. First bevel 38, second bevel 40, third bevel 42, and fourth bevel 44 may be machined from a metal, such as carbon steel, or the bevels may include a composite material in order to reduce manufacturing cost and/or the coefficient of friction for the reciprocating frame.

Bars 46 extend substantially across the y-axis of perimeter 30. First half 34 of bars 46 extend toward first half 34 of perimeter 30 and second half 36 of bars 46 extend toward second half 36 of perimeter 30. A plurality of support members 48 are also located within perimeter 30, but on either side of center scraper 32. Support members 48 run parallel to bars 46 and extend substantially across the y-axis of perimeter. First half 32 of support members 48 extend toward first half 34 of perimeter 30 and second half 34 of support members 48 extend toward second half 34 of perimeter 30. Tubes 50 are located on top of, run the length of, and attach to, support members 48. In one embodiment, tubes 50 are rectangular and have closed beveled ends 51. Tubes 50 may extend through, and be surrounded by, one or more hold-down plates 52. Each hold-down plate 52 is shaped like an upside down letter "L", which is capable of surrounding a tube 50 and attaching to a floor of a silo to prevent the reciprocating frame from drifting.

As described above with reference to FIGS. 2 and 3, reciprocating frame 16 is capable of bi-directional movement across a floor of a silo. Surfaces of reciprocating frame 16 are beveled to reduce friction between reciprocating frame 16 and material within a silo. When first half 34 is the leading half of reciprocating frame 16, first bevel 38 and third bevel 42 will slide under material within a silo. When second half 36 is the leading half of reciprocating frame 16, second bevel 40 and forth bevel 44 will slide under material within a silo. Thus, the beveled surfaces of perimeter 30 and center scraper 32 reduce friction between material and reciprocating frame 16 while agitating material adjacent a floor of a silo. Bars 46 are configured to attach reciprocating frame 16 to a pushrod of a hydraulic system (such as pushrod 28 of hydraulic system 18 in FIG. 3). Support members 48 help maintain the shape of reciprocating frame 16, as well as support tubes 50. Tubes 50 cooperate with one or more hold-down plates 52 to keep reciprocating frame 16 from floating upwards or over to one side. As reciprocating frame 16 moves from a first position to a second position, tubes 50 slide through one or more hold-down plates 52 thereby keeping reciprocating frame 16 adjacent a floor of a silo.

Figure 5:
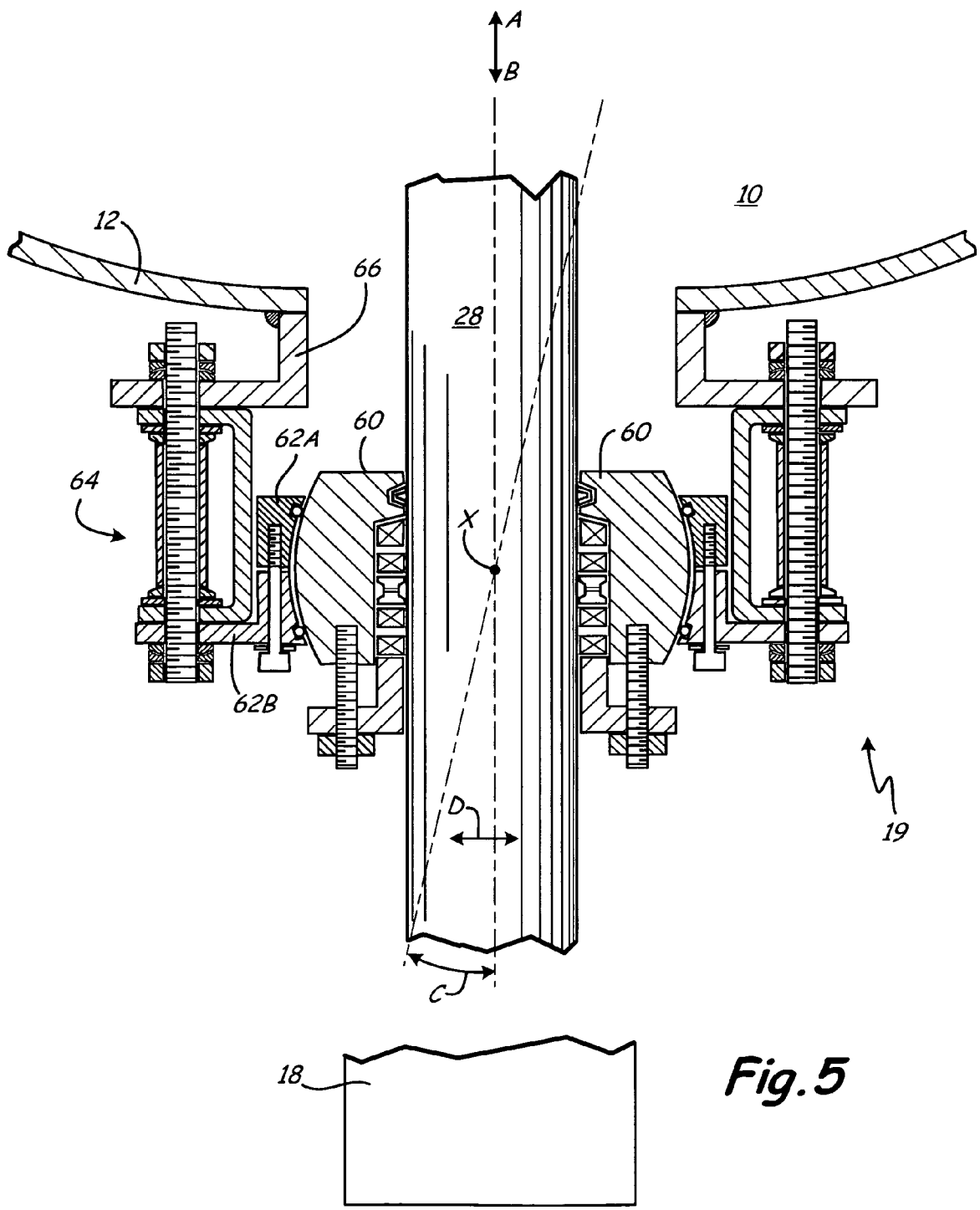
FIG. 5 is a cross-section of a stuffing box.

FIG. 5 is a cross-section taken on line 5-5 of FIG. 1 depicting push-rod 28 as it extends through stuffing box 19. Visible in FIG. 5 are silo 10, perimeter wall 12, hydraulic cylinder 18, and stuffing box 19 having angular floating seal housing 60, lateral floating seal housing 62A, 62B, and flexible connection assembly 64.

Push-rod 28 extends from an interior of silo 10 out through an opening in perimeter wall 12 and continues through stuffing box 19 to hydraulic cylinder 18. As described with reference to FIGS. 2-4, hydraulic cylinder 18 actuates the reciprocating frame across the floor of silo 10 via push-rod 28. In order to accomplish this purpose, a first end of push-rod 28 is attached to the reciprocating frame and a second end of push-rod 28 is attached to hydraulic cylinder 18. When hydraulic cylinder 18 is activated, push-rod 28 extends further into silo 10 thereby actuating the reciprocating frame across the floor of silo 10 in direction A. After fully extending in direction A, a majority of push-rod 28 is within silo 10 such that the reciprocating frame occupies a position remote from hydraulic cylinder 18 (such as second position 26 depicted in FIG.

3). Push-rod 28 then retracts back in direction B to return the reciprocating frame to a position adjacent stuffing box 19 and hydraulic cylinder 18 (such as first position 24 depicted in FIG. 2). While retracting, the excess length of push-rod 28 exits silo 10 via an opening in perimeter wall 12 and extends through stuffing box 19 to hydraulic cylinder 18.

The contents of stuffing box 19 include angular floating seal housing 60, lateral floating seal housing 62A, 62B, and flexible connection assembly 64. Angular floating seal housing 60 is annular and surrounds push-rod 28 as it enters stuffing box 19. The outer surface of angular floating seal housing 60 is generally spherically shaped. Located on both sides of, and attached to, angular floating seal housing 60 is lateral floating seal housing 62. Lateral seal housing 62 can be split such that first portion 62A is attached to angular floating seal housing 60 and a second portion 62B is attached to both angular floating seal housing 60 and flexible connection assembly 64. Division of lateral seal housing 62 into two portions 62A, 62B eases assembly of lateral seal housing 62 around the spherical outer surface of angular floating seal housing 60. Flexible connection assembly 64 is located in between, and attached to, lateral floating seal housing 62B and flange 66.

As push-rod 28 enters stuffing box 19 (moves in direction B), the longitudinal axis of push-rod 28 is not always perfectly centered within stuffing box 19. Angular floating seal housing 60, lateral floating seal housing 62A, 62B, and flexible connection assembly 64 accommodate push-rod 28 misalignment by following and flexing or "floating" with push-rod 28. Angular floating seal housing 60 is configured to accommodate angular misalignment of push-rod 28 by floating in direction C. The spherical outer surface of angular floating seal housing 60 permits pivoting of push-rod 28 about point X. Lateral floating seal housing 62 and flexible connection assembly 64 are configured to accommodate lateral misalignment of push-rod 28 by floating in direction D. Lateral floating seal housing 62 transmits lateral movement to flexible connection assembly 64, where a rod and elastomer connecter absorb the lateral movement (described in further detail with reference to FIG. 6). Conventional stuffing boxes are rigidly constructed and become worn from push-rod 28 misalignment, but the seal of stuffing box 19 float with push-rod 28 to provide flexibility in both the angular and lateral direction.

Figure 6:
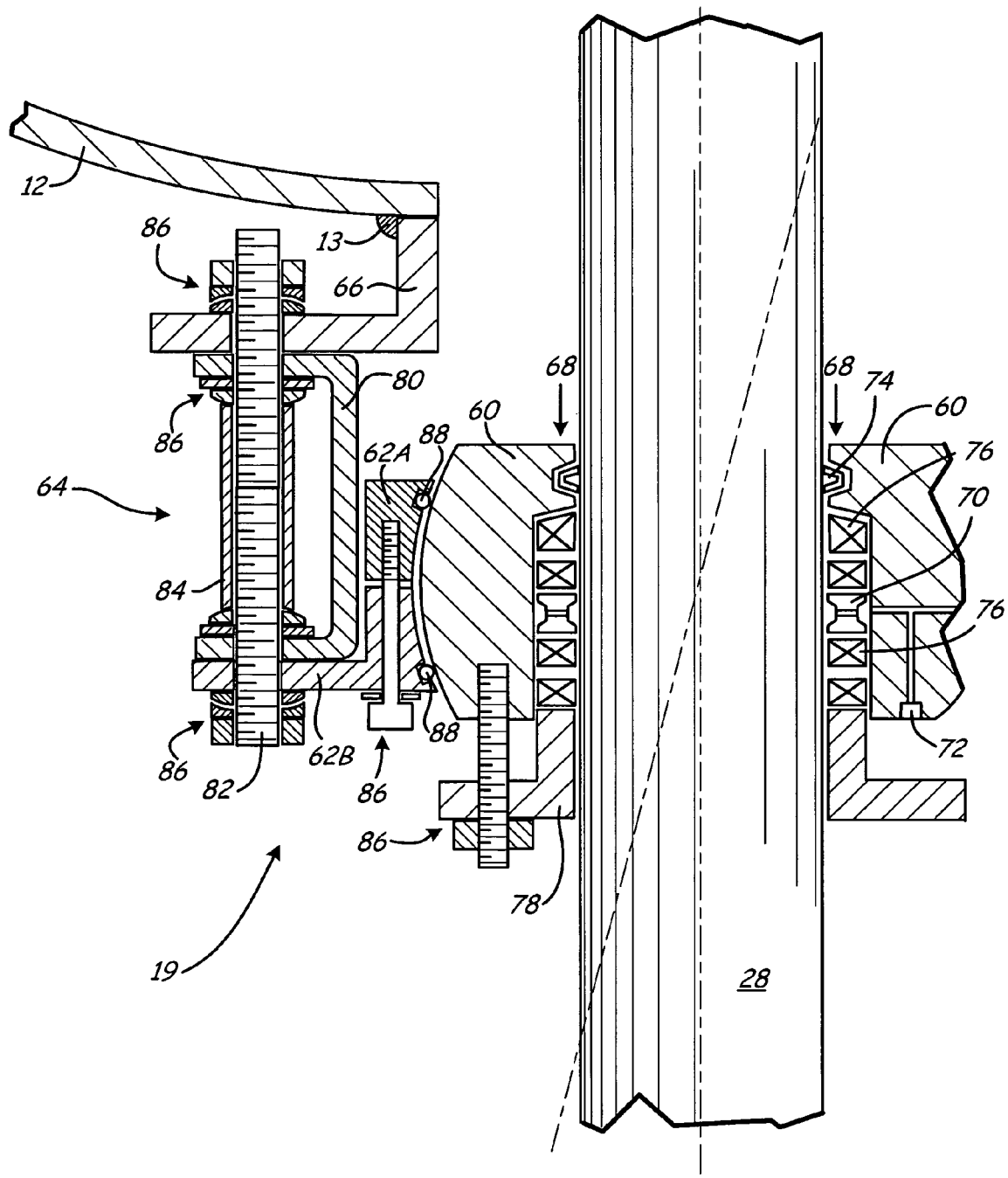
FIG. 6 is a detailed cross-section of the stuffing box.

FIG. 6 is a detailed cross-section of stuffing box 19. Illustrated in FIG. 6 are perimeter wall 12, weld 13, stuffing box 19, push-rod 28, angular floating seal housing 60, lateral floating seal housing 62A, 62B, flexible connection assembly 64, flange 66, scraping means 68, lantern ring 70, and grease port 72. Scraping means 68 includes scraper 74, rope packing rings 76, and compression ring 78. Flexible connection assembly 64 includes flexible connector 80, rod 82, and compression tube 84. Also depicted are securing means 86 and O-ring seals 88.

Weld 13 attaches flange 66 to perimeter wall 12. Located inside of stuffing box 19, within angular floating seal housing 60 and surrounding push-rod 28 are scraping means 68 and lantern ring 70. In the depicted embodiment, lantern ring 70 is fluidly connected to grease port 72. Scraping means 68 includes annular scraper 74, a plurality of rope packing seals 76, and compression ring 78. In the depicted embodiment, annular scraper 74 is located adjacent to an opening in perimeter wall 12, followed by rope packing seals 76, lantern ring 70, additional rope packing seals 76, and compression ring 78. Compression ring 78 being the component closest to hydraulic cylinder 18.

As push-rod 28 exits silo 10, material accumulated on push-rod 28 is scraped off by scraping means 68 and thus, kept from oozing out into the exterior environment. An exemplary scraping means 68 is annular scraper seal 74. Friction between push-rod and scraping means 68 is reduced by lantern ring 70. Any lubricant, such as grease, can flow through grease port 72, to lantern ring 70 for distribution along push-rod 28. Scraping means 68 can further include a plurality of annular rope-packing rings 76 to ensure thorough removal of silo contents from push-rod 28. Rope-packing rings 76 are formed of Teflon or nylon rope, which abrade and therefore, compression ring 78 is attached to rope-packing rings 76 to tighten and flatten rope-packing rings 76. Scraping means 68 are located within angular floating seal housing 60 and therefore, float with push-rod 28.

The internal components of stuffing box 19 may be connected by any suitable means. In the depicted embodiment, flange 66 of stuffing box 19 is attached to perimeter wall 12 by weld 13. Adjacent flange 66, and connected to stuffing box 19, is flexible connection assembly 64 including flexible connector 80, rod 82, and compression tube 84. A first end of flexible connector 80 is secured flange 66 and a second end of flexible connector 80 is secured to lateral floating seal housing 62A, 62B. In the depicted embodiment, flexible connector 80 is generally U-shaped having a first end attached to flange 66, a bottom portion at least partially attached to lateral floating seal housing 62A, 62B, a second end attached to the lateral floating seal housing 62B, and an open top portion. Rod 82 extends through lateral seal housing 62B, the open top portion of flexible connector 80, and stuffing box 19. In the depicted embodiment, flexible connector 80 is formed of elastomer and rod 82 is threaded. Surrounding rod 82 is compression tube 84. Securing means 86, such as but not limited to, a hex nut and spherical washer set can fasten rod 82 to flange 66 and lateral floating seal housing 62B. Securing means 86 can also connect portions of lateral seal floating housing 62A, 62B. In the depicted embodiment, o-ring seals 88 are located between lateral seal floating housing 62A, 62B and angular floating seal housing 60.

Flexible connection assembly 64 is configured to secure lateral floating seal housing 62 to stuffing box 19, but without rigidity. As push-rod 28 moves in and out of silo 10, lateral movement is transferred to first lateral floating seal housing 62A, 62B and second to flexible connection assembly 64 where lateral movement is absorbed by flexible connector 80, rod 82, and compression tube 84. Specifically, rod 82 pivots about securing means 86, such as a spherical washer set, while flexible connector 80 deforms to absorb the lateral movement. Compression tube 84 restricts the deformation of flexible connector 80 such that it does not deform excessively deform in direction A or B while still allowing deformation in direction D. Compression tube 84 also maintains compressive force on both ends of flexible connector 80 to form a seal against flange 66 and lateral seal housing 62. In order to keep silo contents sealed off from the exterior environment while lateral floating seal housing 62A, 62B moves to accommodate lateral misalignment, o-ring seals 88 can be placed between lateral floating seal housing 62A, 62B and angular floating seal housing 60. Floating stuffing box 19 not only uses scraping means 68 to scrape push-rod 28 as it exits silo 10, but also uses angular and lateral floating seal housings 60, 62 to form a floating seal around push-rod 28, thereby lengthening the life expectancy of stuffing box 19 components.

Figure 7:
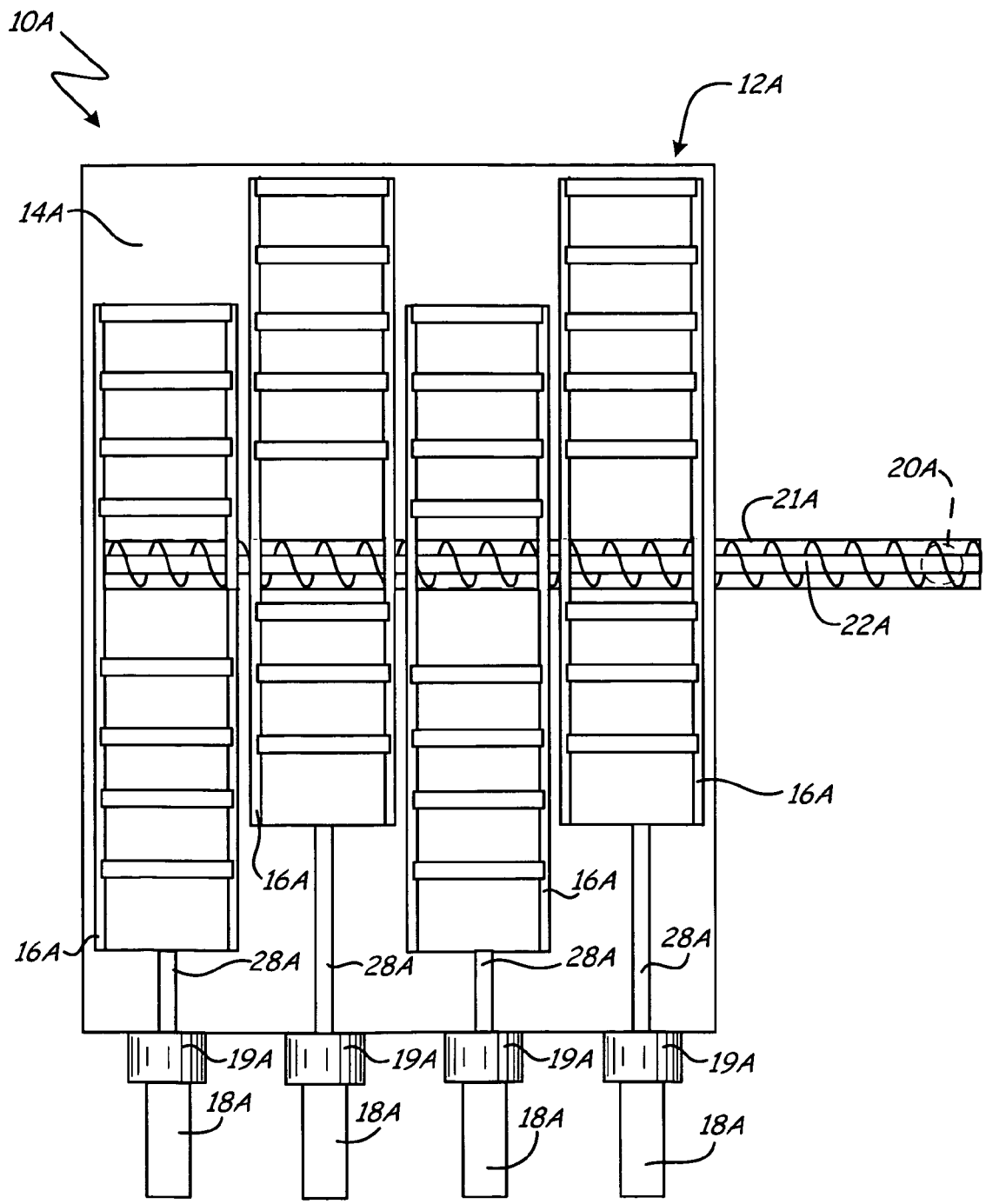
FIG. 7 is a top view of an alternative embodiment of a silo having a plurality of reciprocating frames.

FIG. 7 is a top view of an alternative embodiment of silo 10A having a plurality of reciprocating frames 16A. Illustrated in FIG. 7 are silo 10A, exterior wall 12A, floor 14A, reciprocating frames 16A, hydraulic cylinders 18A, stuffing boxes 19A, outlet 20A, opening 21A, screw conveyor 22A, and push-rods 28A. The components of silo 10A are substantially similar to the components of silo 10 described above. The discussion below focuses on the differences between silo 10 and silo 10A, namely, the number and shape of reciprocating frames 16A.

Silo 10A is defined by upstanding exterior wall 12A resting on top of rectangular floor 14A. In the depicted embodiment, four reciprocating frames 16A are located immediately above and parallel to floor 14A, although more or less reciprocating frames 16A are equally possible. Reciprocating frames 16A are attached to, and actuated by, hydraulic cylinders 18A. Screw conveyor 22A is located beneath opening 21A in floor 14A. In the depicted embodiment, opening 21A and screw conveyor 22A are all centrally located, although they can be offset to one side or another. Also, outlet 20A is illustrated beneath screw conveyor 22A, but can also be located on one or more sides of screw conveyor 22A. Reciprocating frames 16A are connected to hydraulic cylinders 18A by push-rods 28A. More specifically, push-rods 28 extend from reciprocating frames 16A through exterior wall 12A and continue to extend through stuffing boxes 19A to reach hydraulic cylinders 18A.

Reciprocating frames 16A operate in much the same manner as reciprocating frame 16 described above. Hydraulic cylinders 18A extend and retract push-rods 28A, which actuate reciprocating frames 16A across floor 14A. As pushrods 28A extend further into silo 10A, reciprocating frames 16A are moved to a position remote from hydraulic cylinders 18A. As pushrods 28A retract back out of silo 10A, reciprocating frames 16A are moved to a position adjacent hydraulic cylinders 18A. In the depicted embodiment, reciprocating frames 16A are staggered so that as one moves away from hydraulic cylinder 18A the neighboring reciprocating frame 16A is moves closer to hydraulic cylinder 18A. When reciprocating frames 16A move across floor 14A, material within silo 10A is pushed and pulled toward opening 24A such that it can fall through opening 24A onto screw conveyor 22A.

The inclusion of a plurality of reciprocating frames 16A necessitates the inclusion of a plurality of stuffing boxes 19A, but the internal components of stuffing boxes 19A are similar to stuffing box 19 described above. Stuffing boxes 19A scrape excess material off of push-rods 28A as they exit silo 10A. Stuffing boxes 19A also accommodate angular and lateral misalignment of push-rods 28A through use of angular and lateral floating seal housing (such as angular floating seal housing 60 and lateral floating seal housing 62 depicted in FIG. 6). By providing flexibility in both the angular and lateral directions, each stuffing boxes 19A independently "float" with their respective push-rods 28A.

Although the present invention has been described with reference to preferred embodiments, workers skilled in the art will recognize that changes may be made in form and detail without departing from the spirit and scope of the invention.

The invention claimed is:

1. A silo comprising:
   a wall defining an interior and an exterior;
   a floor attached to the wall;
   an opening in the floor;
   at least one reciprocating frame positioned immediately above and parallel to the floor;
   a stuffing box adjacent an opening in the wall;
   a hydraulic cylinder adjacent the stuffing box;
   a push-rod extending from the hydraulic cylinder, through the stuffing box, into the opening in the wall, and connecting to the reciprocating frame for actuating movement of the reciprocating frame across the floor,
   wherein the stuffing box forms a floating seal around the push-rod capable of moving angularly and laterally with the push-rod to accommodate misalignment, the stuffing box including:
      scraping means surrounding the push-rod for removing material from the push-rod as it exits the opening in the wall;
      an angular floating seal housing connected to the scraping means for accommodating angular movement of the push-rod;
      a lateral floating seal housing connected to the angular floating seal housing for accommodating lateral movement of the push-rod;
      a flexible connector having a first end attached to the exterior wall and a second end attached to the lateral floating seal housing; and
      a separate rod extending through the flexible connector and the lateral floating seal housing, wherein the flexible connector flexes to accommodate push-rod movement.

2. The silo of claim 1, wherein the scraping means includes at least one rope packing seal.

3. The silo of claim 2, further comprising:
   a compression ring attached to the rope packing seal for compressing the rope packing seals.

4. The silo of claim 1, wherein the scraping means includes at least one scraper seal.

5. The silo of claim 1, wherein the annular floating seal housing and the lateral floating seal housing are connected by at least one O-ring seal.

6. The silo of claim 1, wherein the lateral floating seal housing is split.

7. The silo of claim 1, further comprising:
   a flange fixed to the exterior perimeter wall, wherein the first end of the flexible connector is attached to the flange and the rod extends through the flange.

8. The silo of claim 7, wherein the flexible connector is generally U-shaped having a first end attached to the flange, a bottom portion at least partially attached to the lateral floating seal housing, a second end also attached to the lateral floating seal housing, and an open top portion, wherein the rod extends through the open top portion.

9. The silo of claim 7, wherein the flange is welded to the exterior perimeter wall.

10. The silo of claim 7, further comprising:
    a compression tube surrounding the rod to keep the flexible connector from excessive deformation.

11. The silo of claim 7, further comprising:
    means for securing the rod to the lateral floating seal housing.

12. A silo comprising:
    a wall defining an interior and an exterior;
    a floor attached to the wall;
    an opening in the floor;
    at least one reciprocating frame positioned immediately above and parallel to the floor;
    a stuffing box adjacent an opening in the wall;
    a hydraulic cylinder adjacent the stuffing box;
    a push-rod extending from the hydraulic cylinder, through the stuffing box, into the opening in the wall, and connecting to the reciprocating frame for actuating movement of the reciprocating frame across the floor;
    scraping means surrounding the push-rod for removing material from the push-rod as it exits the opening in the wall;

an angular floating seal housing connected to the scraping means for accommodating angular movement of the push-rod;
a lateral floating seal housing connected to the angular floating seal housing for accommodating lateral movement of the push-rod;
a flange fixed to the exterior perimeter wall;
a generally U-shaped flexible connector having a first end attached to the flange, a bottom portion at least partially attached to the lateral floating seal housing, a second end also attached to the lateral floating seal housing, and an open top portion; and
a rod extending through the flange, the open top portion of the flexible connector, and the lateral floating seal housing.

13. The silo of claim 12, wherein the scraping means includes at least one rope packing seal or scraper seal.

14. The silo of claim 12, wherein the annular floating seal housing and the lateral floating seal housing are connected by at least one O-ring seal.

15. A silo comprising:
a wall defining an interior and an exterior;
a floor attached to the wall;
an opening in the floor;
at least one reciprocating frame positioned immediately above and parallel to the floor;
a stuffing box adjacent an opening in the wall;
a hydraulic cylinder adjacent the stuffing box;
a push-rod extending from the hydraulic cylinder, through the stuffing box, into the opening in the wall, and connecting to the reciprocating frame for actuating movement of the reciprocating frame across the floor;
scraping means surrounding the push-rod for removing material from the push-rod as it exits the opening in the wall;
an angular floating seal housing connected to the scraping means for accommodating angular movement of the push-rod;
a lateral floating seal housing connected to the angular floating seal housing for accommodating lateral movement of the push-rod;
a flange fixed to the exterior perimeter wall;
a flexible connector having a first end attached to the flange and a second end attached to the lateral floating seal housing;
a rod extending through the flange, the flexible connector, and the lateral floating seal housing; and
a compression tube surrounding the rod to keep the flexible connector from excessive deformation.

16. The silo of claim 15, wherein the scraping means includes at least one rope packing seal or scraper seal.

17. The silo of claim 15, wherein the annular floating seal housing and the lateral floating seal housing are connected by at least one O-ring seal.

* * * * *